Patented June 14, 1938

2,120,675

UNITED STATES PATENT OFFICE 2,120,675

PREPARATION OF BROMINATED HYDROCARBONS

Howard S. Nutting and Peter S. Petrie, Midland, Mich., assignors to The Dow Chemical Company, Midland, Mich., a corporation of Michigan No Drawing. Application November 18, 1936, Serial No. 111,400

20 Claims. (Cl. 260—162)

This invention relates to the preparation of bromine substituted aliphatic hydrocarbon compounds from the corresponding chloro-compounds by treating said chloro-compounds with aluminum bromide.

It is well known that anhydrous aluminum bromide is capable of replacing chlorine with bromine in chlorinated aliphatic hydrocarbons. This reaction was first described in Comptes Rendus 130:1191 (1900) by the reaction of solid anhydrous aluminum bromide, in granulated or other finely divided form, with the chlorinated hydrocarbon. Such procedure is simple and direct but suffers from the disadvantage that anhydrous aluminum bromide, due to its very great affinity for moisture, is exceedingly difficult to prepare in a finely divided condition by crushing, grinding, or similar means, and is equally difficult to store or handle without deterioration, due to the rapidity with which it absorbs water from the atmosphere.

U. S. Patent No. 1,891,415 describes a similar reaction wherein the aluminum bromide in molten condition is reacted with the chloro-hydrocarbon. Since, in the preparation of the brominated hydrocarbons as described, it is necessary to conduct the reaction at fairly low temperatures, e. g., in the neighborhood of 60° C. or below in order to minimize tar formation and the production of undesirable by-products, the use of such molten salt has certain disadvantages due to the tendency of the aluminum bromide to freeze at temperatures below 100° C.

In both of the above procedures great difficulty is encountered in maintaining a uniform temperature throughout the reaction zone due to the fact that in each case the brominating agent is added in a highly concentrated form, and does not readily distribute itself through the reaction mixture. When aluminum bromide in solid or molten form is added to a chloro-hydrocarbon, high concentrations of the aluminum bromide are built up in portions of the mixture and the resultant local over-heating invariably leads to an undesirable tar formation. The aluminum chloride formed as a by-product in the reaction tends to accumulate as a semi-solid sludge in the reaction zone, hampering the maintenance of adequate agitation and necessitating the carrying out of the reaction as a batch process, since this sludge must be periodically removed by mechanical means from the reaction zone. Furthermore, the above procedures have been found unsuitable for the preparation of such compounds as trimethylene bromide, methyl-tri-methylene bromide, and carbon tetrabromide, due to the formation of excessive amounts of tarry decomposition products, and tendency of the 1-3 dihalo-aliphatic hydrocarbons to rearrange to the 1-2 dihalo or alkylene halide type of compound.

We have discovered that the above difficulties and inconveniences may be obviated and the bromination step made more generally applicable to the preparation of bromine substituted aliphatic hydrocarbons by the carrying out of the process in the presence of an inert organic solvent for the aluminum bromide and chloro-aliphatic hydrocarbon. The expression "bromine substituted aliphatic hydrocarbons" as hereinafter employed includes compounds containing both chlorine and bromine such as 1-chloro-3-bromo-propane, mono-chloro-tri-bromo-methane, etc.

In preparing bromine substituted hydrocarbons from their corresponding chloro-derivatives according to our improved procedure the anhydrous aluminum bromide is dissolved in a suitable inert organic solvent such as ethyl bromide, and this solution thereafter slowly reacted with the chlorohydrocarbon which may or may not have been previously diluted with a similar inert solvent. In preparing the aluminum bromide solution the anhydrous inorganic salt is preferably added to the solvent in small portions over a period of time and with cooling and agitation in order that said solvent be not decomposed or evaporated off by the heat of solution of the aluminum bromide.

The aluminum bromide solution is generally supplied to the reaction zone in an amount slightly in excess of that theoretically required, which amount is calculated on the theory that 1 mol. of aluminum bromide is capable of replacing 3 gram-atoms of chlorine. When less than the theoretical amount of aluminum bromide is employed, a mixed product is generally obtained which may be separated into its constituents by fractional distillation. Since the solvent may be substantially quantitatively recovered by fractional distillation following the completion of the reaction, we generally employ a considerable excess thereof over the amount required to dissolve the aluminum bromide. Among the advantages accruing to the use of such excess solvent are (1) that the heat of solution of the aluminum bromide during the preparation of the solvent-salt solution is more readily dissipated, (2) that the reaction temperature during the bromination step is readily controlled, and (3) that the aluminum chloride formed as a by-product in the reaction is thereby held in solution and does not settle out as a viscous sludge.

The aluminum bromide solution is reacted with the chloro-aliphatic hydrocarbon at a temperature not appreciably in excess of the boiling point of the solvent employed and preferably below 20° C. The reaction temperature can be conveniently controlled by operating at the refluxing temperature of the reaction mixture. Since such refluxing temperature is largely governed by the particular solvent employed in the reaction when operating under reflux conditions, the choice of solvent is dependent upon the temperature required for effecting reaction between the aluminum bromide and chlorinated hydrocarbon. Furthermore, the boiling temperature of the solvent employed is preferably such that said solvent may be conveniently separated by fractional distillation from the product of reaction. While the reaction can be readily carried out under ordinary pressure, sub- or super-atmospheric pressure may be employed, if desired. It is convenient, though not essential, that the chloro-hydrocarbon be also dissolved in an inert solvent, since the use of such diluent further assists in dissipating the heat of reaction. When the aluminum bromide solution is added to the chloro-aliphatic hydrocarbon the reaction is usually complete after from about one-half to 10 hours depending upon the amounts of solvent employed and the number of chlorine atoms to be replaced by bromine in the chloro-aliphatic compound. If the procedure is reversed and the chloro-aliphatic hydrocarbon added to the aluminum bromide solution, a somewhat longer reaction time may be required. Following the completion of the bromination step, the reaction mixture is agitated for a short period of time, i. e., until reaction is substantially complete, thereafter washed with water to remove dissolved inorganic salts therefrom, and distilled to recover the solvent employed and to isolate the desired brominated product.

The following examples illustrate certain ways in which our process may be carried out, but are not to be construed as limiting our invention.

*Example 1*

300 grams (1.12 mols) of anhydrous aluminum bromide was added slowly and with cooling and agitation to 400 grams of ethyl bromide, the temperature being maintained below 25° C. throughout said addition, to form an aluminum bromide-ethyl bromide solution. This solution was thereafter added over a period of approximately one-half hour to a mixture of 130 grams (0.85 mol.) of carbon tetrachloride and 300 grams of ethyl bromide, the temperature of the reaction mixture being maintained at −10° to 0° C. throughout the reaction. The reaction mixture was allowed to stand for one-half hour following the completion of the aluminum bromide addition and thereafter poured into 700 grams of cracked ice whereby any unreacted aluminum bromide and the aluminum chloride formed as a reaction by-product was decomposed and taken up in water solution. The oily layer was separated from the inorganic salt-containing water solution and fractionally distilled whereby there was recovered 630 grams of ethyl bromide, 39 grams of a mixture of chloro-bromo-methanes, and 235 grams (0.71 mol.) of carbon tetrabromide product. A single crystallization of this product from ethyl alcohol resulted in the isolation of 178 grams of substantially pure carbon tetrabromide as a white crystalline compound melting at 88–90° C.

In a similar manner a slight excess of aluminum bromide, i. e. 305 grams (1.15 mols) thereof, was dissolved in 350 grams of ethyl bromide and reacted with 110 grams (0.71 mol.) of carbon tetrachloride in 277 grams of ethyl bromide whereby there was obtained 29 grams of a mixture of the chloro-bromo-methanes, and 195 grams (0.59 mol.) of a carbon tetrabromide product. Re-crystallization of this product from alcohol yielded 167 grams of essentially pure carbon tetrabromide, melting at 88°–90° C.

The reaction of 427 grams (1.77 mols) of finely divided anhydrous aluminum bromide with 200 grams (1.3 mols) of carbon tetrachloride in the absence of solvent and at a temperature of approximately 0° C. resulted in the formation of a pasty mass of a product comprising not only carbon tetrabromide but also the various bromo-chloro-methanes. Fractional distillation of this product, after removal of aluminum salts therefrom by washing with ice water, resulted in the isolation of 151 grams of a mixture of mono-chloro-tribromo-methane and carbon tetrabromide boiling between 155° and 189° C. from which the carbon tetrabromide was not readily separable.

*Example 2*

In a similar manner 207 grams (0.765 mol.) of aluminum bromide was dissolved in 430 grams of ethyl bromide and the resultant solution added to a mixture of 170 grams (1.5 mols) of tri-methylene chloride and 400 grams of ethyl bromide at temperatures ranging between 2° and 5° C. over a period of 1.5 hours. The reacted mixture was washed in ice water and the oil layer steam-distilled therefrom, whereby there was obtained 5.0 grams (0.045 mol.) of unreacted dichloro-propane, 34 grams (0.215 mol.) of 1-chloro-3-bromo-propane, and 192 grams (0.95 mol.) of trimethylene bromide boiling at 160°–163° C. at 750 millimeters pressure. 755 grams of ethyl bromide was recovered during the fractionation as a low boiling fraction.

The reaction of 133 grams of aluminum bromide in finely divided form with 111 grams of tri-methylene chloride under essentially the same reaction conditions but in the absence of solvent resulted in a sticky tar-like product from which only 24 grams of tri-methylene bromide was obtained.

The attempted preparation of tri-methylene bromide by the reaction of molten aluminum bromide with the corresponding chloro-derivative resulted in the formation of appreciable quantities of propylene bromide with practically no tri-methylene bromide being formed in the reaction.

*Example 3*

311 grams (1.17 mols) of aluminum bromide in 400 grams of ethyl bromide was reacted with 220 grams (3.4 mols) of ethyl chloride in 211 grams of ethyl bromide substantially as described in Example 1. 851 grams of substantially pure ethyl bromide was isolated from the oily reaction product obtained thereby.

While ethyl bromide is employed as a solvent in all of the above examples, other inert solvents such as carbon disulfide, ligroin, ethylene bromide, 1,3-dibromo-propane, propyl bromide, etc., may be substituted therefor.

Representative of other bromine containing products which may be prepared according to the described method of procedure are ethylene bromide, propylene bromide, propyl bromide, amyl bromide, methyl-trimethylene bromide, methylene bromide, bromoform, hexabromo-ethane, benzyl bromide, phenyl-ethyl bromide, ethylene chloro-bromide, etc.

If desired when utilizing low boiling reactants such as methyl chloride, methylene chloride, ethyl chloride, etc., the reaction may be carried out under super-atmospheric pressure and in the usual type of pressure reactor whereby losses of reactants and reaction products by evaporation may be minimized.

Other modes of applying the principle of our invention may be employed instead of those explained, change being made as regards the method herein disclosed provided the step or steps stated by any of the following claims or the equivalent of such stated step or steps be employed.

We therefore particularly point out and distinctly claim as our invention:—

1. The method of preparing a bromine substituted aliphatic hydrocarbon which comprises reacting the corresponding chlorinated aliphatic hydrocarbon with a solution consisting of anhydrous aluminum bromide dissolved in an inert solvent.

2. The method of preparing a bromine substituted aliphatic hydrocarbon which comprises reacting the corresponding chlorinated aliphatic hydrocarbon with anhydrous aluminum bromide, both of said reactants being dissolved in an inert solvent.

3. The method of preparing a bromine substituted aliphatic hydrocarbon which comprises reacting the corresponding chlorinated aliphatic hydrocarbon with a solution consisting of anhydrous aluminum bromide dissolved in a liquid brominated aliphatic hydrocarbon.

4. The method of preparing a bromine substituted aliphatic hydrocarbon which comprises reacting the corresponding chlorinated aliphatic hydrocarbon with a solution consisting of anhydrous aluminum bromide dissolved in a liquid brominated aliphatic hydrocarbon, at a temperature not in excess of the refluxing temperature of the reaction mixture.

5. The method of preparing a bromine substituted aliphatic hydrocarbon which comprises reacting the corresponding chlorinated aliphatic hydrocarbon with anhydrous aluminum bromide, both of said reactants being dissolved in a liquid brominated aliphatic hydrocarbon.

6. The method of preparing a bromine substituted aliphatic hydrocarbon which comprises reacting the corresponding chlorinated aliphatic hydrocarbon with anhydrous aluminum bromide, both of said reactants being dissolved in a liquid brominated aliphatic hydrocarbon, at a temperature not in excess of the refluxing temperature of the reaction mixture.

7. The method of preparing a bromine substituted aliphatic hydrocarbon which comprises reacting the corresponding chlorinated aliphatic hydrocarbon with a solution consisting of anhydrous aluminum bromide dissolved in ethyl bromide.

8. The method of preparing a bromine substituted aliphatic hydrocarbon which comprises reacting the corresponding chlorinated aliphatic hydrocarbon with a solution consisting of anhydrous aluminum bromide dissolved in ethyl bromide, while maintaining the reaction temperature below 20° C.

9. The method of preparing a bromine substituted aliphatic hydrocarbon which comprises reacting the corresponding chlorinated aliphatic hydrocarbon with anhydrous aluminum bromide, both of said reactants being dissolved in ethyl bromide.

10. The method of preparing a bromine substituted hydrocarbon which comprises reacting the corresponding chlorinated aliphatic hydrocarbon with anhydrous aluminum bromide, both of said reactants being dissolved in ethyl bromide, at a temperature below 20° C.

11. The method of preparing carbon tetrabromide which comprises reacting carbon tetrachloride with a solution consisting of anhydrous aluminum bromide dissolved in a liquid brominated aliphatic hydrocarbon.

12. The method of preparing carbon tetrabromide which comprises reacting carbon tetrachloride with a solution consisting of anhydrous aluminum bromide dissolved in a liquid brominated aliphatic hydrocarbon, at a temperature not in excess of the refluxing temperature of the reaction mixture.

13. The method of preparing carbon tetrabromide which comprises reacting carbon tetrachloride with anhydrous aluminum bromide, both of said reactants being dissolved in a liquid brominated aliphatic hydrocarbon.

14. The method of preparing carbon tetrabromide which comprises reacting carbon tetrachloride with a solution consisting of anhydrous aluminum bromide dissolved in ethyl bromide.

15. The method of preparing a 1,3-dibromo-aliphatic hydrocarbon which comprises reacting the corresponding 1,3-dichloro-aliphatic hydrocarbon with a solution consisting of anhydrous aluminum bromide dissolved in a liquid brominated aliphatic hydrocarbon.

16. The method of preparing a 1,3-dibromo-aliphatic hydrocarbon which comprises reacting the corresponding 1,3-dichloro-aliphatic hydrocarbon with anhydrous aluminum bromide, both of said reactants being dissolved in a liquid brominated aliphatic hydrocarbon prior to said reaction.

17. The method of preparing trimethylene bromide which comprises reacting trimethylene chloride with a solution consisting of anhydrous aluminum bromide dissolved in a liquid brominated aliphatic hydrocarbon.

18. The method of preparing trimethylene bromide which comprises reacting trimethylene chloride with a solution consisting of anhydrous aluminum bromide dissolved in ethylene bromide, while maintaining the reaction temperature below 20° C.

19. The method of preparing trimethylene bromide which comprises reacting trimethylene chloride with anhydrous aluminum bromide, both of said reactants being dissolved in ethyl bromide.

20. The method of preparing trimethylene bromide which comprises reacting trimethylene chloride with anhydrous aluminum bromide, both of said reactants being dissolved in ethyl bromide, while maintaining the reaction temperature below 20° C.

HOWARD S. NUTTING.
PETER S. PETRIE.